United States Patent Office 3,352,927
Patented Nov. 14, 1967

3,352,927
METHOD FOR THE PREPARATION
OF XYLENOL
Donald L. De Vries, South Holland, and Patrick W. Ryan, Chicago Heights, Ill., assignors to Sinclair Research, Inc., New York, N.Y., a corporation of Delaware
No Drawing. Filed Jan. 27, 1964, Ser. No. 340,490
6 Claims. (Cl. 260—629)

This invention relates to a method for preparing 3,5-xylenol. This dialkyl substituted phenol is of value in resin production to give readily curable formaldehyde-type thermosetting polymers. The rate of reaction of 3,5-xylenol with formaldehyde in resin formation is reportedly about 7.75 times that of phenol while the reactivity of other xylenol isomers is somewhat less than that of phenol. Some isomers, for example, 2,4-xylenol, do not produce a curable resin with formaldehyde.

Most known routes for synthesis favor the formation of m-xylenol isomers other than the coveted 3,5-xylenol. Commercial xylenols containing limited quantities of 3,5-xylenol are now wholly obtained from very limited natural sources (coal tar acids) for lack of a satisfactory synthetic route. These coal tar acid products may contain up to about 25% 3,5-xylenol with most types containing considerably less of this desired isomer.

In the method of this invention 4-halo-meta-xylene is hydrolyzed to 3,5-xylenol form or a mixture of xylenols predominating in this isomer form. The reaction produces xylenols consisting primarily of 3,5-xylenol, say, about 70% of the yield with lesser amounts, say, about 30% of the yield, of 2,4-xylenol, and very minor quantities of 2,6-xylenol. The difference in boiling points of the xylenol isomers permits separation of essentially pure 3,5-xylenol by distillation.

In this invention hydrolysis of the chloro or other halo xylene takes place at a temperature of about 300–500° C., preferably about 325–390° C. The pressure employed may vary, say from about 500 to 10,000 p.s.i. and is usually the autogenous pressure of the vaporized starting materials at the temperatures employed and preferably is about 1500–4000 p.s.i. Water is generally supplied to the hydrolysis reaction and although the amount is usually not critical, enough water needs to be present to solubilize at least part of the reactant materials and products. For hydrolysis, an alkali metal (sodium, potassium, etc.) hydroxide is generally supplied in an aqueous solution. This solution is often used in an amount sufficient to supply about 0.2–10 moles of alkali metal hydroxide per mole of halo-m-xylene, preferably about 2.5 to 4.5 moles. An aqueous solution containing about 0.2–15 moles of alkali metal hydroxide per liter of aqueous solution, preferably about 2–10 moles, will fulfill both water and alkali meta hydroxide requirements. The selectivity of the reaction to the production of xylenols usually is improved by restricting conversion to below about 35%, preferably below about 30%.

The recycle of products boiling higher than xylenols permits hydrolysis of xylyl ethers formed in the reaction and thus increases the yield of xylenols. After hydrolysis, the alkali metal xylenol salts produced may be readily acidified to give the hydroxyl-containing materials.

The xylene feedstock to the reaction may have chlorine, bromine, etc., as the halogen. Preferably 4-chloro-m-xylene is employed and it may contain other materials, for instance, it may be mixed with its isomers. Preferably the feedstock contains at least about 75% of the 4-chloro-m-xylene, the balance usually being the 2-isomer.

Chloro-m-xylenes are readily provided from m-xylene under conditions known to the art which often yield mixtures of about 77–90% 4-chloro-m-xylene, the balance generally the 2-isomer.

Examples

The following examples of the method of this invention are to be considered illustrative only and not limiting.

The hydrolyses of the chloro-m-xylenes reported below were carried out in a 280 cc. capacity manganese-steel bomb equipped to be rocked mechanically. The opening at the end of the bomb led to a blowout disk, 3000 lb. gauge, and a pressure release valve. In each run 0.1 mole of an about 80:20 mixture of 4- and 2-chloro-m-xylene and .25 mole of NaOH as 10% aqueous solution were charged to the bomb. The bomb was rocked while heating electrically to temperatures of 308° to 348°. It required approximately 1 hour to attain a bomb skin temperature of 300° C. At the conclusion of each reaction period the bomb was cooled as rapidly as possible with water. A chemical separation of the xylenol product was effected by extracting the reaction mixture with ether and acidification, followed by extraction of the xylenols with ether. The neutral and acid extracts were analyzed for chloro-m-xylenes and xylenols, respectively, by gas chromatography using an internal standard. The table lists the results.

TABLE

| Run No. | 75 | 79 | 83 |
|---|---|---|---|
| Time (hrs.) at >300° skin temp | 4 | 4.3 | 1.8 |
| Max. skin temp. (° C.) | 330 | 344 | 348 |
| Max. press. (p.s.i.) | 1,690 | 1,700 | 1,750 |
| Moles Cl-Xyl recovered | 0.06 | 0.037 | 0.075 |
| Percent Conv | 40 | 63 | 25 |
| Moles Xylenols recovered | 0.011 | 0.017 | 0.011 |
| Percent Selectivity to xylenols | 27.6 | 27 | 44 |
| Isomer Distribution (percent): | | | |
| 2,6 | 1.9 | 2.9 | 1.1 |
| 2,4 | 29.3 | 26.5 | 30.3 |
| 3,5 | 68.9 | 70.6 | 68.6 |

It can readily be seen from the data of the table that the method of this invention provides a process for the production of xylenols rich in 3,5-xylenol from readily available materials. The process includes aqueous alkali hydrolysis at temperatures of at least about 300° C. to effect conversion of 4-chloro-m-xylene to 3,5-xylenol as a high proportion of the xylenol reaction product. Where alkali contact with 4-chloro-m-xylene took place at a temperature of 308° C. and a pressure of 715 p.s.i., both of which conditions are less than preferred, the reaction was so slow that little of the organic starting material was converted in 2½ hours, indicating that a longer reaction time was needed under these conditions.

It is claimed:

1. In a method for the production of 3,5-xylenol the step which consists essentially of contacting 4-halo-meta-xylene at a temperature of about 300 to 500° C. with an amount of aqueous solution, containing about 0.2 to 15 moles of alkali metal hydroxide per liter, sufficient to supply about 0.2 to 10 moles of alkali metal hydroxide per mole of halo-metaxylene.

2. The method of claim 1 in which the 4-halo-meta-xylene is contained in a mixture with 2-halo-metaxylene.

3. The method of claim 2 where the mixture contains at least about 75% of the 4-isomer.

4. The method of claim 1 in which the halo is chloro.

5. The method of claim 4 in which the temperature is about 300–390° C.

6. The method of claim 5 in which is provided about 2 to 10 moles of alkali metal hydroxide per liter of aqueous solution and sufficient of the aqueous solution to provide about 2.5 to 4.5 moles of alkali metal hydroxide per mole of chloro-m-xylene.

References Cited

UNITED STATES PATENTS 2,193,760  4/1940  Dreisbach et al. ----- 260—629
3,234,291  2/1966  Kelly -------------- 260—620

LEON ZITVER, *Primary Examiner.*

W. B. LONE, *Assistant Examiner.*